(12) United States Patent
Kim

(10) Patent No.: US 6,262,955 B1
(45) Date of Patent: Jul. 17, 2001

(54) TRACKING CONTROL METHOD AND APPARATUS AND RECORDING MEDIUM ADAPTIVE TO THE SAME

(75) Inventor: Dae Young Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/139,430

(22) Filed: Aug. 25, 1998

(30) Foreign Application Priority Data

Aug. 30, 1997 (KR) .................................. 97-45340
Oct. 16, 1997 (KR) .................................. 97-53070

(51) Int. Cl.$^7$ .................................................. G11B 7/09
(52) U.S. Cl. ........................ 369/44.41; 369/13; 369/44.26
(58) Field of Search .............................. 369/44.26, 44.13, 369/44.41, 275.3, 275.4; 250/201.5

(56) References Cited

U.S. PATENT DOCUMENTS

| | | | |
|---|---|---|---|
| 5,339,302 | * | 8/1994 | Takahashi et al. ................. 369/44.13 |
| 5,383,169 | * | 1/1995 | Shinoda et al. .................... 369/44.41 |
| 5,508,991 | * | 4/1996 | Onigata et al. .................... 369/44.13 |
| 5,537,373 | | 7/1996 | Horikiri . |
| 5,715,217 | * | 2/1998 | Fuji .................................... 369/44.26 |
| 5,936,933 | * | 8/1999 | Miyamoto et al. ............... 369/44.13 |

FOREIGN PATENT DOCUMENTS

| | | |
|---|---|---|
| 0798702A2 | 10/1997 | (EP) . |
| 5-298697 | 12/1993 | (JP) . |
| 6325482 | 11/1994 | (JP) . |
| 7311947 | 11/1995 | (JP) . |
| 9106576 | 4/1997 | (JP) . |
| 9712513 | 3/1997 | (KR) . |

\* cited by examiner

Primary Examiner—Thang V. Tran

(57) ABSTRACT

A tracking control method and apparatus for providing a stable tracking control for an optical recording medium of land/groove recording system. Wobbling signals are detected from each side of a track irradiated with a laser light beam in land and groove tracks formed on the optical recording medium in a wobbled shape. The wobbling signals are added and subtracted or multiplied to generate a tracking error signal to be used for the tracking control. The tracking error signal has a positive or negative voltage level in accordance with whether a light beam is inclined toward the inner circumference side or the outer circumference side on the basis of the center lines of the land and groove tracks.

13 Claims, 10 Drawing Sheets

TRACKING CONTROL METHOD AND APPARATUS AND RECORDING MEDIUM ADAPTIVE TO THE SAME

BACKGROUND OF THE INVENTION

1. Field of the Invention

This invention relates to a track control system for tracking a laser light beam along the center of an optical recording medium, and more particularly to a tracking control method and apparatus that is adaptive to an optical recording medium having wobbled groove signal tracks. Also, this invention is directed to an optical recording medium suitable for the tracking control method.

2. Description of the Prior Art

Recently, optical recording media have been prevalent as recording media for recording information such as video and audio data. Such optical recording media include a read-only type disc such as CD-ROM, DVD-ROM, etc.; a write-once-read-many (WORM) type disc such as CD-R, DVD-R, etc.; and a rewritable type disc such as CD-RW, DVD-RAM, etc.

As shown in FIG. 1, the read-only type disc includes spiral-shaped tracks 2 extending from the inner circumference into the outer circumference thereof. Information pit trains 4 representing recorded information are defined on the track 2. The information pit trains 4 are usually arranged in a line along a reference line and distances between adjacent tracks are constant.

Typically, a one-beam or three beam system tracking control is used to reproduce the information recorded on the pit trains 4 on the tracks of the read-only type disc. The one-beam or three-beam system tracking control allows a light beam to trace the track depending upon a symmetry of the information pit trains in the width direction of the tracks.

On the other hand, in the WORM type disc and the rewritable optical disc, guiding grooves for the tracking control are provided instead of the pit trains. An example of such a disc is a CD-R type disc shown in FIG. 2.

The CD-R in FIG. 2 has land and groove signal tracks 10 and 12 that are defined in parallel in a spiral shape. Each groove signal track 12 has a wobbled area in which both sides thereof are wobbled in the same phase; while each land signal tracks 10 has a wobbled area in which both sides thereof are wobbled in a different phase. Information is recorded on the same-phase wobbled area. In other words, information is recorded only on the groove signal tracks 12. In a disc having the land and groove tracks 10 and 12 as described above, the tracking control is easy because the boundaries between adjacent tracks 10 and 12 are distinguished. However, the recording capacity is reduced because an information is recorded only on the groove signal tracks 12.

To increase the recording capacity of the disc having the land and groove signal tracks, a so-called 'land/groove recording system disc' has been developed, wherein information can be recorded on both the land and groove signal tracks like a DVD-RAM shown in FIG. 3.

The DVD-RAM of FIG. 3 has land and groove signal tracks 10 and 12 that are divided into a number of sectors defining the size of an information to be recorded. Each sector includes an identification information area, hereinafter referred simply to as "ID area", in which an address information and the like is recorded in prepit trains 14, and a recording area in which information can be recorded on both land and groove tracks 10 and 12.

Each prepit train 14 of the ID area is divided into a first prepit train 14a for the land track and a second prepit train 14b for the groove track. These first and second prepit trains 14a and 14b are positioned at an extending line of the land and groove boundary side, respectively. Since the first and second prepit trains 14a and 14b are positioned as mentioned above, an optical pickup reads all the first and second prepit trains 14a and 14b positioned at the extending line of the boundary side of a track being currently traced when a laser light beam traces the land track 10 as well as the groove track 12.

Two identification information signals for two prepit trains 14a and 14b read in this manner are processed employing only one of the prepit trains, for example, only the first prepit train 14a when a light beam is positioned at the land track 10. Accordingly, an information is recorded on both the land and groove tracks 10 and 12.

To accurately track an optical disc, it is necessary to have a tracking control apparatus for controlling a position of light beam in such a manner that the light beam is traced along the center lines of the land and groove tracks 10 and 12. A tracking control apparatus of push-pull system is usually used as such a tracking control apparatus. The push-pull system tracking control apparatus performs a tracking on a basis of a tracking error signal Te produced by subtracting two photo detecting signals from a two-divisional photo detector 20 as shown in FIG. 5.

However, the push-pull system tracking control apparatus must invert the polarity of a tracking error signal Te for one of the land and groove tracks 10 and 12 when it is used for an optical disc of land/groove recording system as mentioned earlier. This is caused by a fact that the tracking error signal Te has positive(+) and negative(−) amplitudes as shown in FIG. 4 as the light beam is moved in a radial direction.

Referring to FIG. 4, the tracking error signal Te has a positive(+) amplitude when the light beam is positioned between the center line of the land track 10 and the center line of a groove track 12 when moving towards the inner circumference; and has a negative(−) amplitude when the light beam is positioned between the center line of the land track 10 and the center line of a groove track 12 when moving towards the outer circumference. Accordingly, the tracking control apparatus must respond to the tracking error signal Te depending upon whether a light beam is traced along the land track 10 or the groove track 12.

More specifically, if a light beam is traced along the land track 10 and the tracking error signal Te has a negative(−) polarity, then the tracking control apparatus must move the light beam toward the inner circumference. Otherwise, if a light beam is traced along the groove track 12 and the tracking error signal Te has a negative(−) polarity, then the tracking control apparatus must move the light beam toward the outer circumference. As a result, the push-pull system tracking control apparatus must identify the land and groove tracks and control the polarity of the tracking error signal based on the identified result when it is used for an optical disc of land/groove recording system.

For instance, as shown in FIG. 5, a conventional push-pull system tracking control apparatus used for an optical disc of land/groove recording system includes a subtractor 22 and a low pass filter(LPF) 24 that are connected, in cascade, to a two-divisional photo detector 20. The two-divisional photo detector 20 converts the light beam reflected by the land or groove track 10 or 12 into an electrical signal to generate first and second photo detecting signals for representing a light distribution state. The subtractor 22 subtracts the first and second photo detecting signals from the two-divisional photo detector 20 to produce a tracking error signal Te. As shown in FIG. 4, the tracking error signal Te has a waveform that changes polarities as the light beam is moved in the radial direction of the optical disc. The LPF 24 eliminates high frequency noise signals included in the tracking error signal Te.

The push-pull system tracking control apparatus further includes a buffer 26 and an inverter 28 connected, in parallel, to the LPF 24, a control switch 30 for selecting any one of output signals of the buffer 26 and the inverter 28, and a tracking controller 32 and a tracking actuator 34 connected, in series, to the control switch 30. The buffer 26 passes the tracking error signal Te from the LPF 24 and the inverter 28 inverts the tracking error signal Te from the LPF 24, and both signals Te and Te' are applied to the control switch 30.

The control switch 30 delivers either the tracking error signal Te or the inverted tracking error signal Te' to the tracking controller 32 in accordance with a logical value of a land/groove(L/G) identification signal, that is, in accordance with whether a light beam is being currently traced along the land track 10 or the groove track 12.

Then, the tracking controller 32 applies a tracking drive signal to the tracking actuator 34 in accordance with the tracking error signal Te or the inverted tracking error signal Te' from the control switch 30. The tracking actuator 34 responding to the tracking drive signal moves an objective lens (not shown) in the radial direction of an optical disc, thereby tracing the light beam along the center line of the land or groove track 10 or 12. The push-pull system tracking control apparatus having the above-mentioned configuration must identify whether the light beam is being traced along the land track 10 or the groove track 12, and must selectively invert the tracking error signal in accordance with the land/groove identification result.

With the optical disc as shown in FIG. 3, the land/groove identification becomes possible with the aid of the prepit trains 14 in the ID area. However, the prepit trains 14 may be defective or contaminated with dust making it impossible to accurately detect the prepit trains, which in turn make it impossible to identify land or groove tracks. This results in the push-pull system tracking control apparatus of FIG. 5 being prevented from tracing the light beam along the center lines of the land and groove tracks. In other words, conventional tracking control method applied to the disc of land/groove recording system requires an accurate land/groove track identification for stable tracking control.

SUMMARY OF THE INVENTION

Accordingly, it is an object of the present invention to provide a tracking control method and apparatus that can perform a stable tracking control for an optical recording medium of land/groove recording system without a land/groove identification signal.

A further object of the present invention is to provide a tracking control method and apparatus that is suitable for an optical recording medium having wobbled land and groove signal tracks.

Still further object of the present invention is to provide a recording medium that is adaptive to the above-mentioned tracking control method and apparatus.

In order to achieve these and other objects of the invention, a tracking control method according to one aspect of the present invention includes detecting wobbling signals from each side of a track irradiated with the light beam; operating the wobbling signals to generate a tracking error signal; and performing a tracking control based on the tracking error signal.

A tracking control apparatus according to another aspect of the present invention includes signal detecting means for detecting wobbling signals from each side of a track irradiated with the light beam; operation means for operating the wobbling signals from the signal detecting means to generate a tracking error signal; and tracking control means for performing a tracking control based on the tracking error signal from the operation means.

An optical recording medium according to yet another aspect of the present invention includes pit trains defined continuously or intermittently in such a manner to have a wobbled shape with respect to the track direction of the optical recording medium.

A method of providing a tracking control of said optical recording medium according to still another aspect of the present invention includes detecting first and second wobbling signals from each side of the pit trains; operating the first and second wobbling signals to generate a tracking error signal; and performing a tracking control based on the tracking error signal.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 2:
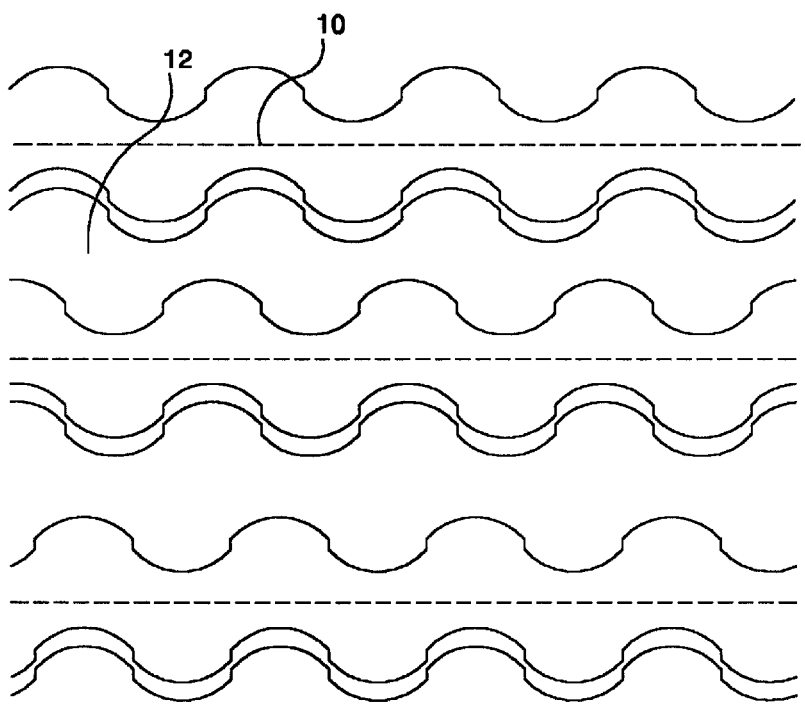
FIG. 2 is a schematic view showing the track structure of a conventional WORM disc such as a CD-R.
Figure 3:
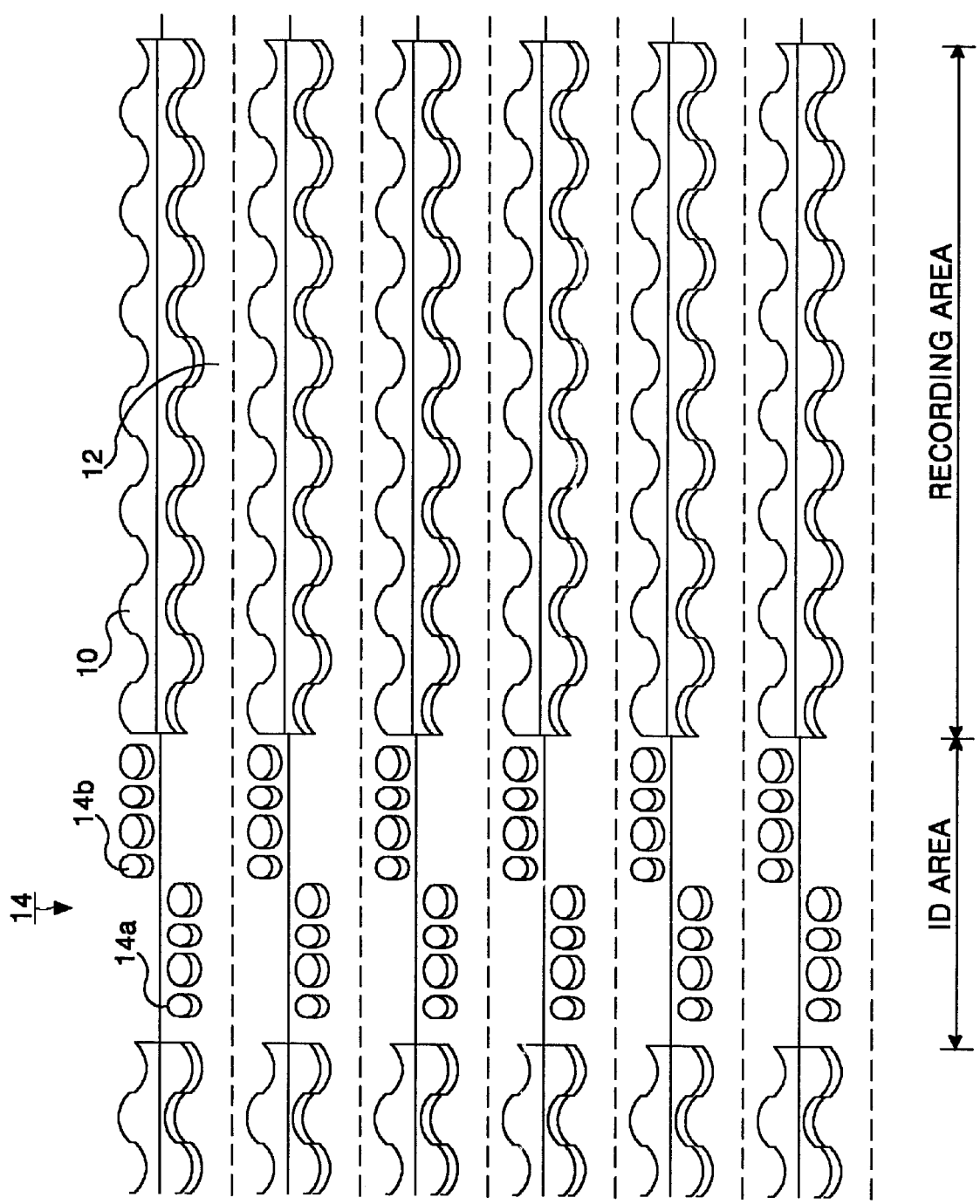
FIG. 3 is a schematic view showing the track structure of a conventional rewritable disc such as a DVD-RAM.
Figure 4:
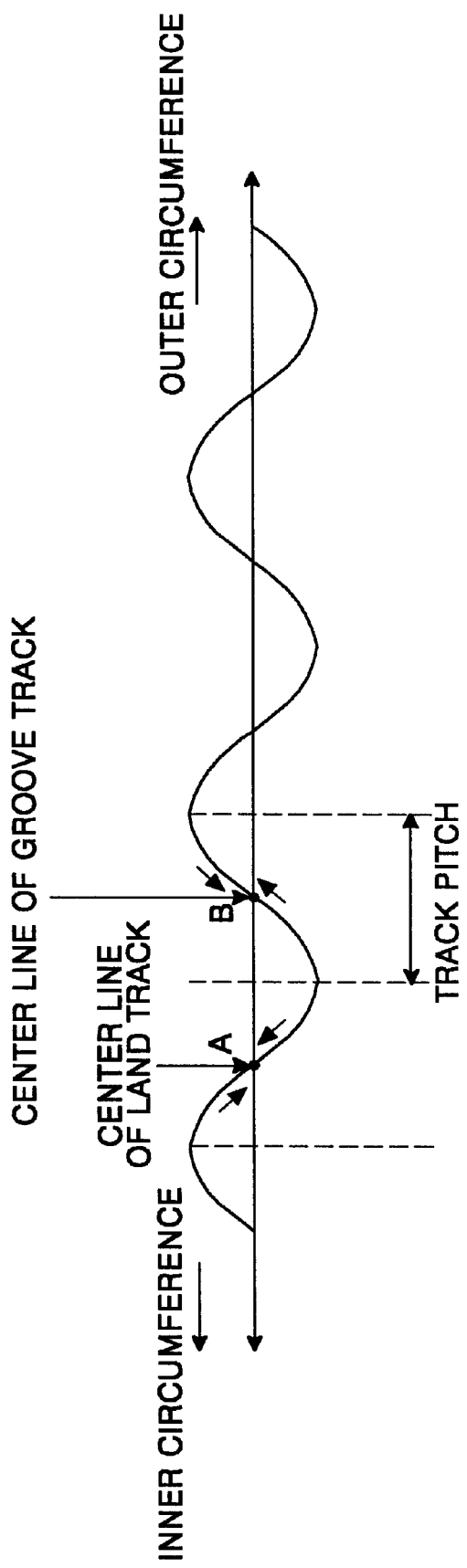
FIG. 4 is a tracking error signal waveform diagram for a conventional push-pull system tracking control apparatus.
Figure 5:
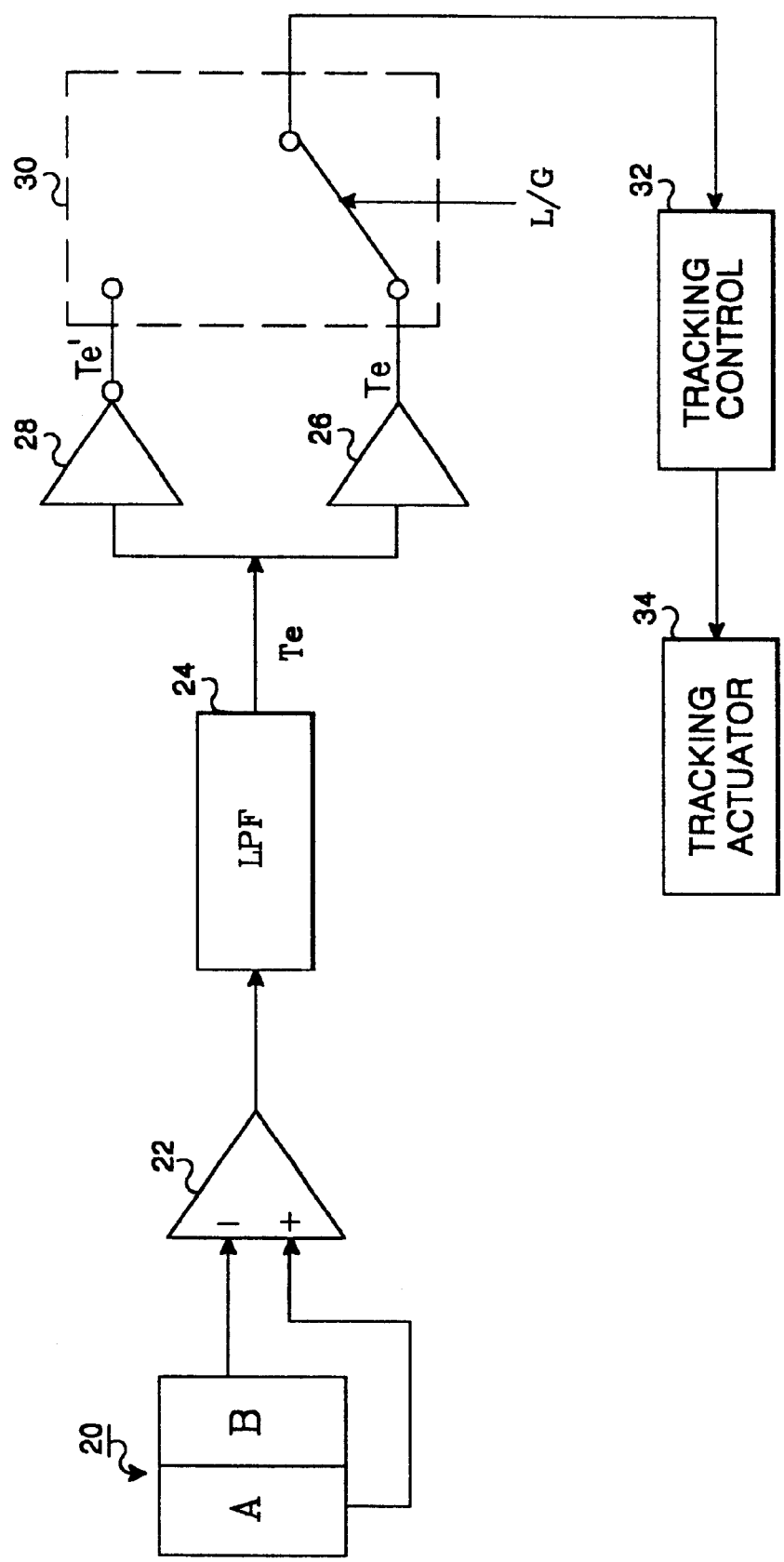
FIG. 5 is a block diagram showing the configuration of the conventional push-pull system tracking control apparatus.
Figure 6:
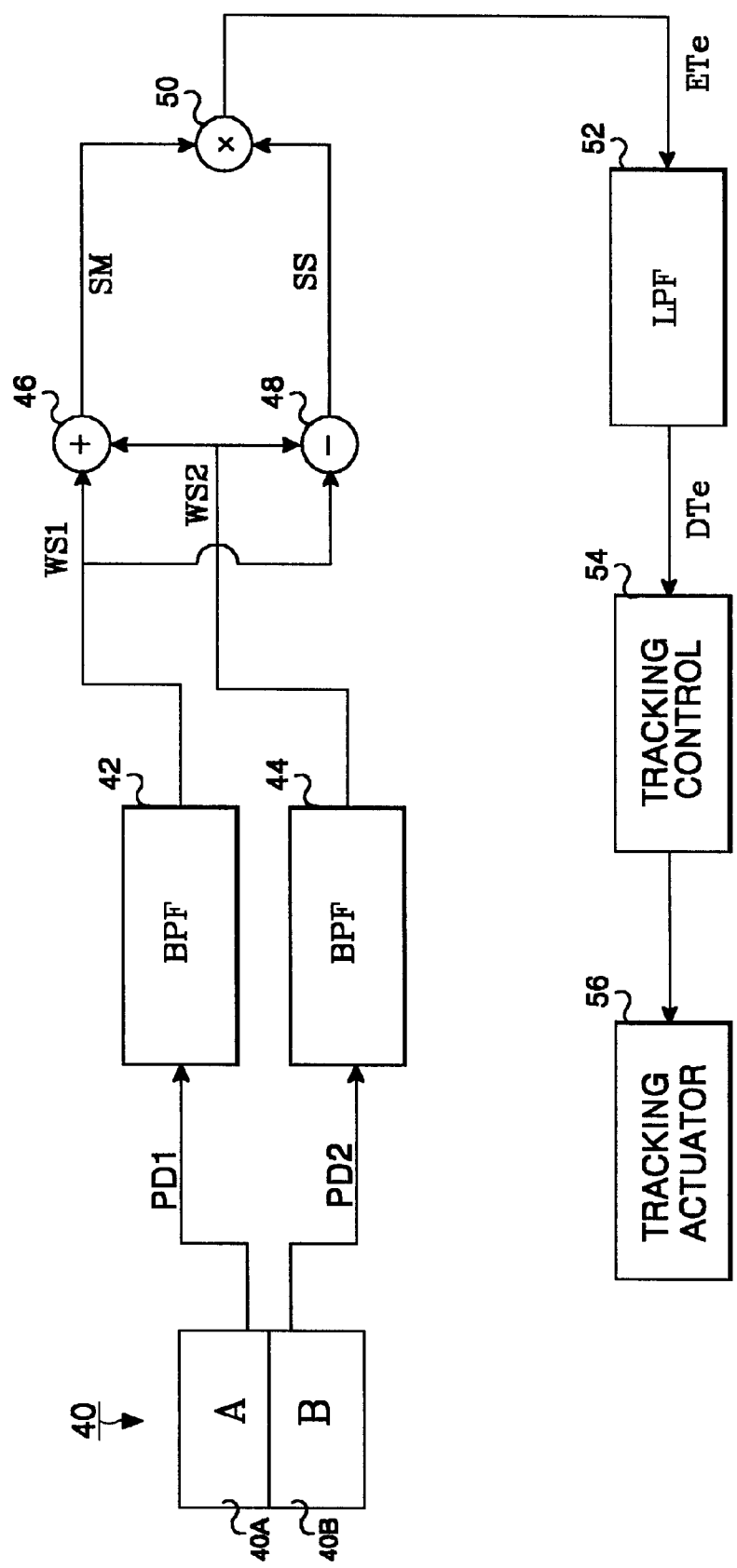
FIG. 6 is a block diagram showing the configuration of a tracking control apparatus according to an embodiment of the present invention.

Referring to FIG. 6, a tracking control apparatus according to an embodiment of the present invention is shown. The tracking control apparatus is adapted to provide tracking control for an optical disc in which land and groove tracks are wobbled in a constant period. In other words, the tracking control apparatus is suitable for providing tracking control for an optical disc in which land and groove signal tracks 10 and 12 are continuously formed as shown in FIG. 2, an optical disc in which land and groove signal tracks 10 and 12 are intermittently formed as shown in FIG. 3 and so on. Also, the tracking control apparatus performs tracking control for an optical disc in which land and groove signal tracks 10 and 12 are alternated every once rotation in such a manner to form a spiral-shaped track, and for an optical disc in which land and groove signal tracks 10 and 12 are formed in parallel from the inner circumference into the outer circumference thereof.

Referring now to FIG. 6, a tracking control apparatus according to the present invention is shown that includes first and second band pass filters(BPFs) 42 and 44 connected, in parallel, to a photo detector 40. The photo detector 40 converts a light beam reflected by land or groove tracks of an optical disc (not shown) into an electrical signal to detect a state of a light beam irradiated onto the land or groove tracks.

To this end, the photo detector 40 consists of a first photo detecting piece 40A for detecting a light quantity irradiated onto the outer circumference portion on the basis of the center line of the land or groove track, and a second photo detecting piece 40B for detecting a light quantity irradiated onto the inner circumference portion of the land or groove track.

A first photo detection signal PD1 for a light quantity irradiated onto the outer circumference half of the land or groove track is generated by the first photo detecting piece 40A and a second photo detection signal PD2 for a light quantity irradiated onto the inner circumference half of the land or groove track is generated by the second photo detecting piece 40B. Alternatively, the photo detector 40 may be composed of four, six, or more photo detecting pieces.

The first BPF 42 band pass filters the first photo detection signal PD1 to derive an outer circumference hand wobbling signal, hereinafter referred to as "first wobbling signal" WS1. Likewise, the second BPF 42 band pass filters to derive an inner circumference hand wobbling signal, hereinafter referred to as "second wobbling signal" WS2.

The tracking control apparatus further includes an adder 46 and a subtractor 48 for commonly receiving the first and second wobbling signals WS1 and WS2 from the first and second BPFs 42 and 44, respectively, and a mixer 50 for receiving output signals of the adder 46 and the subtractor 48. The adder 46 adds the first and second wobbling signals WS1 and WS2 to generate a sum signal SM and the subtractor subtracts the second wobbling signal WS2 from the first wobbling signal WS1 to generates a difference signal SS. Subsequently, the mixer 50 mixes(or multiplies) the sum signal SM from the adder 46 with the difference signal SS from the subtractor 48 to generate a tracking error signal ETe.

The tracking error signal ETe has an envelope component full-wave rectified toward the negative polarity portion or the positive polarity portion. This tracking error signal ETe is filtered a LPF 52, which generates an integrated tracking error signal DTe, a direct current component of ETe. The DTe signal is maintained at a constant negative voltage level or a positive voltage level depending on the rectification of ETe signal.

Furthermore, the tracking control apparatus includes a tracking controller 54 and a tracking actuator 56 connected, in series, to the LPF 52. The tracking controller 54 applies a tracking drive signal to the tracking actuator 56 in accordance with the tracking error signal DTe from the LPF 52. The tracking actuator 56, responding to the tracking drive signal, moves an objective lens (not shown) in the radial direction of the optical disc, thereby tracing the light beam along the center line of the land or groove track 10 or 12.

More specifically, the tracking controller 54 applies the tracking drive signal such that the light beam is moved toward the inner circumference side of the optical disc when the tracking error signal DTe from the LPF 52 is positive. On the other hand, the tracking controller 54 applies the tracking drive signal such that the light beam is moved toward the outer circumference side of the optical disc when the tracking error signal DTe from the LPF 52 has a negative voltage level.

Figure 8A:
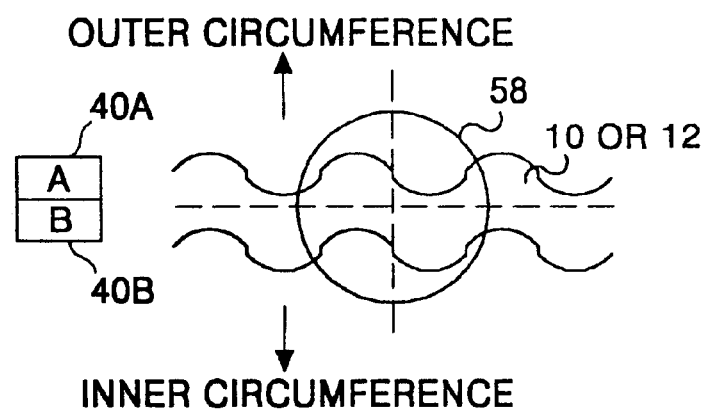
FIG. 8A illustrates a state in which the light beam is centered along the center line of the track.
Figure 8B:
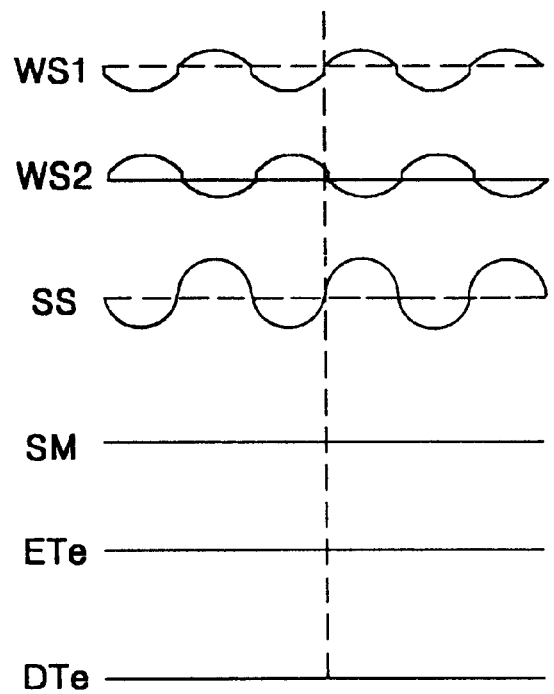
FIG. 8B is waveform diagrams of each part of the tracking control apparatus shown in FIG. 6 when the light beam is centered along the center line of the track.

FIG. 8A illustrates a state in which a light beam 58 is centered along the center line of the land or groove track 10 or 12. FIG. 8B shows output waveforms of each part of the tracking control apparatus of FIG. 6 when a light beam 58 is irradiated onto the track as shown in FIG. 8A.

In FIG. 8B, the first wobbling signal WS1 output from the first BPF 42 has an amplitude equal to and a phase opposite to the second wobbling signal WS2 generated at the second BPF 44. Accordingly, the sum signal SM generated at the adder 46 remains at a ground voltage(i.e., 0 V) and the difference signal SS generated at the subtractor 48 has an amplitude corresponding to twice of the first wobbling signal WS1. As a result, the tracking error signal ETe generated by the mixer 50 and the integrated tracking error signal DTe generated by the LPF 52 is at ground voltage(i.e., 0 V).

Figure 9A:
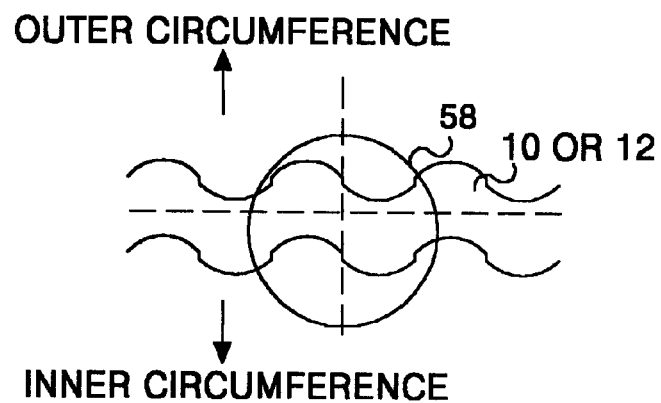
FIG. 9A illustrates a state in which the light beam is off center from the center line of the track toward the inner circumference thereof.
Figure 9B:
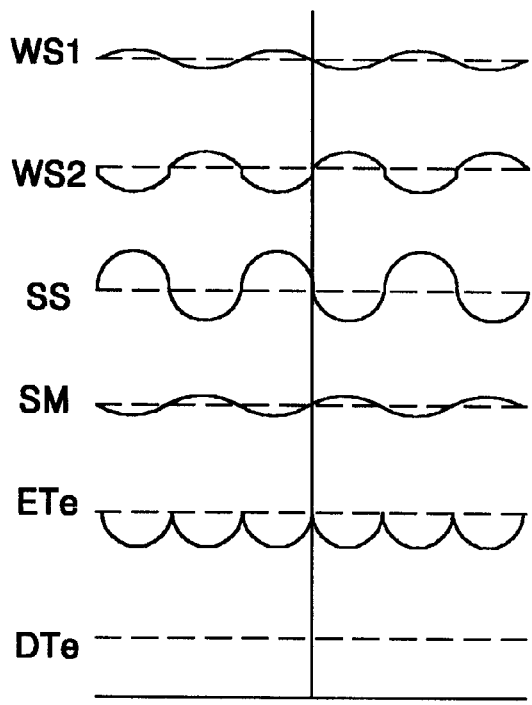
FIG. 9B is waveform diagrams of each part of the tracking control apparatus shown in FIG. 6 when the light beam is off center from the center line of the track toward the inner circumference thereof.

FIG. 9A illustrates a state in which a light beam 58 is off center toward the inner circumference side from the center line of the land or groove signal track 10 or 12. FIG. 9B shows output waveforms of each part of the tracking control apparatus of FIG. 6 when a light beam 58 is irradiated onto the track as shown in FIG. 9A.

In FIG. 9B, the first wobbling signal WS1 output from the first BPF 42 has an amplitude smaller than and a phase opposite to the second wobbling signal WS2 generated at the second BPF 44. Accordingly, the sum signal SM generated by the adder 46 has an amplitude smaller than and a phase opposite to the difference signal SS generated by the subtractor 48.

As a result, the tracking error signal ETe generated by the mixer 50 is full-wave rectified with negative polarity. The integrated tracking error signal DTe generated at the LPF 52 is also negative. The tracking controller 54 moves the light beam 58 towards the outer circumference in accordance with the integrated tracking error signal DTe having a negative voltage level.

Figure 10A:
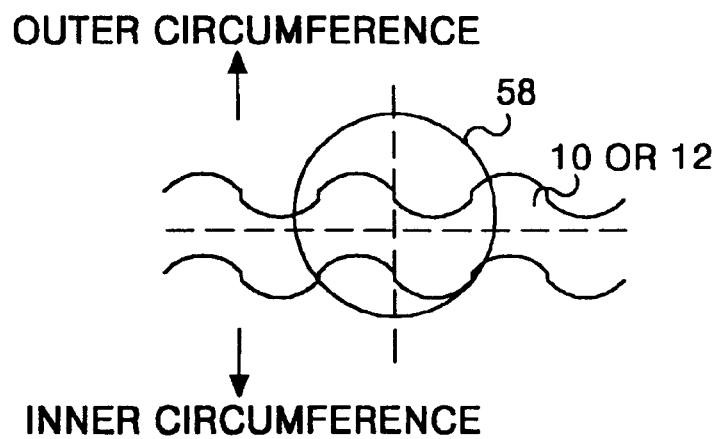
FIG. 10A illustrates a state in which the light beam is off center from the center line of the track toward the outer circumference thereof.
Figure 10B:
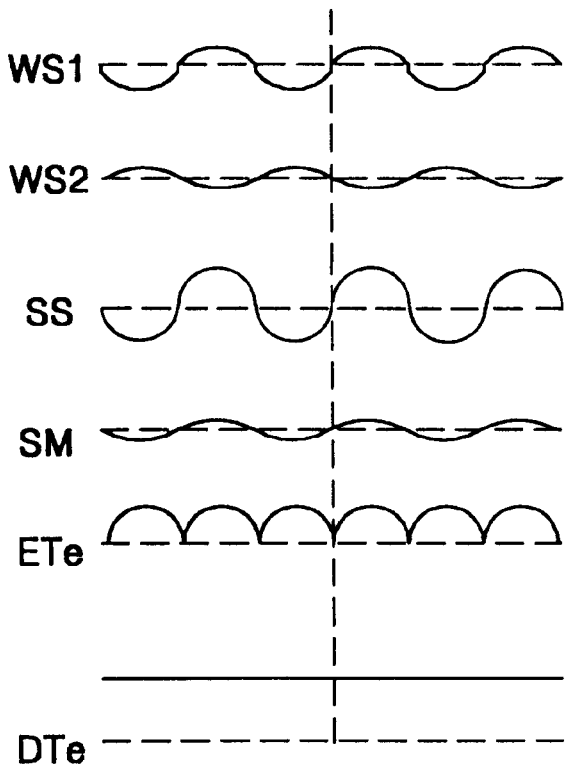
FIG. 10B is waveform diagrams of each part of the tracking control apparatus shown in FIG. 6 when the light beam is off center from the center line of the track toward the outer circumference thereof.

FIG. 10A illustrates a state in which a light beam 58 is off center toward the outer circumference side from the center line of the land or groove signal track 10 or 12. FIG. 10B shows output waveforms of each part of the tracking control apparatus of FIG. 6 when a light beam 58 is irradiated onto the track as shown in FIG. 10A.

In FIG. 10B, the first wobbling signal WS1 output from the first BPF 42 has an amplitude larger than and a phase opposite to the second wobbling signal WS2 generated at the second BPF 44. Accordingly, the sum signal SM generated at the adder 46 has an amplitude smaller than and a phase identical to the difference signal SS generated by the subtractor 48.

As a result, the tracking error signal ETe generated by the mixer 50 is full-wave rectified with positive polarity. The integrated tracking error signal DTe generated at the LPF 52 is also positive. The tracking controller 54 moves the light beam 58 towards the inner circumference side in accordance with the integrated tracking error signal DTe having a positive voltage level.

Figure 7:
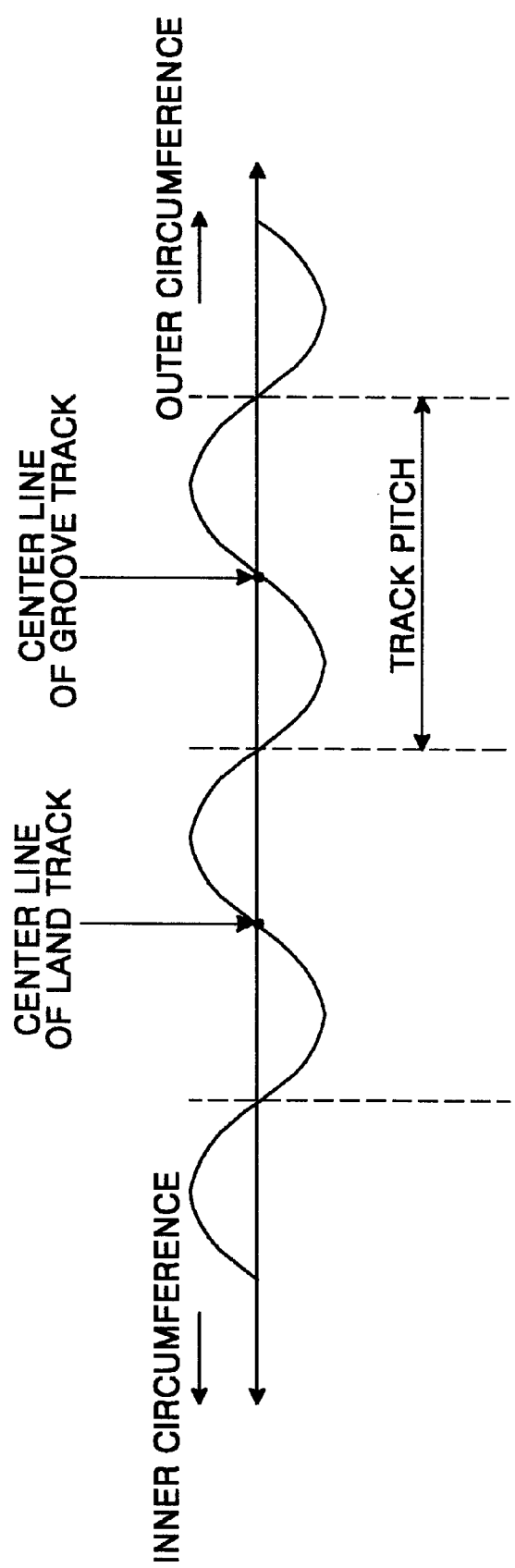
FIG. 7 is an integrated tracking error waveform diagram generated by the tracking control apparatus of FIG. 6 as a light beam is moved in the radial direction of an optical disc.

As described above, the tracking control method and apparatus employing wobbling signals on each side of the track makes use of a tracking error signal as it is without the need for land/groove identification. This is because the integrated tracking error signal DTe in the radial direction of the optical disc, as shown in FIG. 7, has the same characteristics in the land track as in the groove track. That is, if the light beam is off center towards the inner circumference from the center line of the land or the groove track, the negative voltage level of the DTe signal will move the object lens towards the center line of the track. Conversely, if the light beam is off center towards the outer circumference of the track, then the positive DTe signal will move the objective lens towards the center line again.

Thus, with the embodiment of the invention as described above, there is no requirement for an ID area for an optical disc as shown in FIG. 3 because identification of a land or groove is no longer needed.

Figure 11:
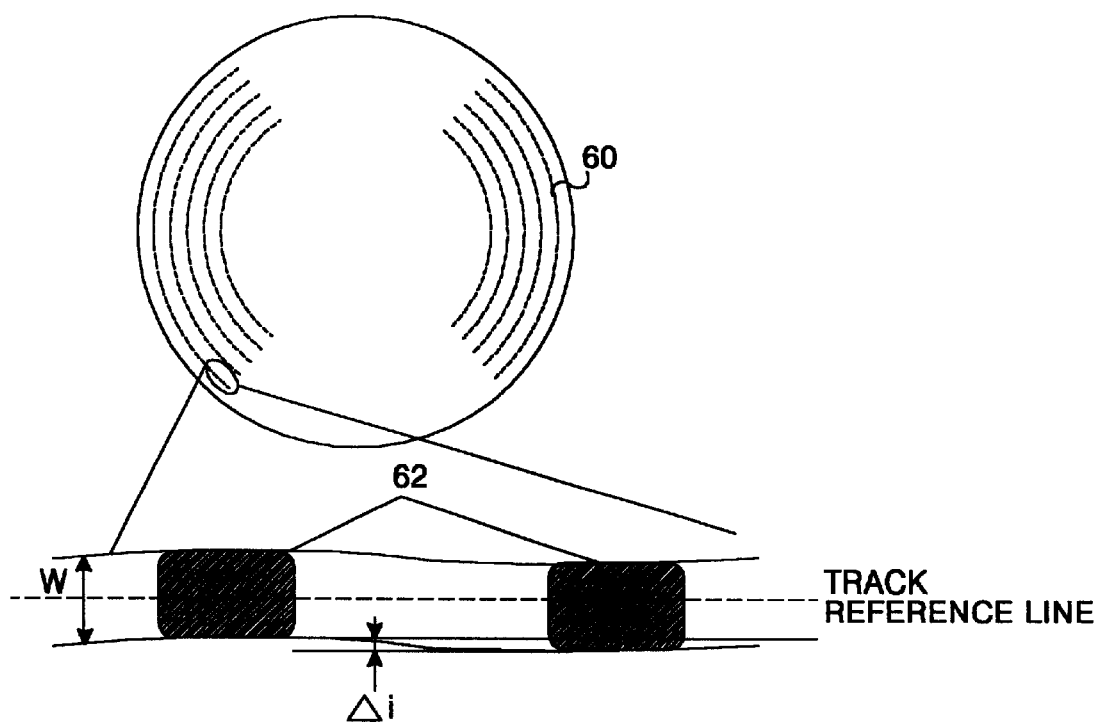
FIG. 11 is a schematic view of an optical disc according to an embodiment of the present invention.

Referring now to FIG. 11, an optical disc according to an embodiment of the present invention is shown. The optical disc of FIG. 11 is a read-only type disc that is capable of employing the above-mentioned tracking control apparatus. In the optical disc of FIG. 11, a signal track 60 includes information pits 62 defined in a wobbled shape at each side of a track reference line, i.e., the center line of the signal track 60, so that each boundary side of the signal track 60 is wobbled in the same phase.

A pit width W defined on the signal track 60 and a wobbling variation space Δi are adjusted such that the disc may be tracked a conventional driving apparatus such as the apparatus to drive optical discs of FIG. 2 and FIG. 3. For example, the pit width W can be set to 300 nm and the wobbling variation space Δi can be set to 40 nm. In other words, the wobbling variation width Δi has a smaller value than the pit width W. But as mentioned above, the pit width W and the wobbling variation space Δi may be adjusted to values different from the above values.

When a light beam is irradiated onto the optical disc having the track structure as described above in such a manner to be progressed along the track reference line, a wobbling signal WS corresponding to a specified frequency band is detected. The detected wobbling signal WS has a waveform identical to a wobbling signal detected from the groove signal track 12 in FIG. 2 or from the land and groove signal tracks 10 and 12 in FIG. 3. Accordingly, the disc of FIG. 11 can be driven using a disc driving apparatus for driving a disc of FIG. 2 or FIG. 3.

Figure 1:
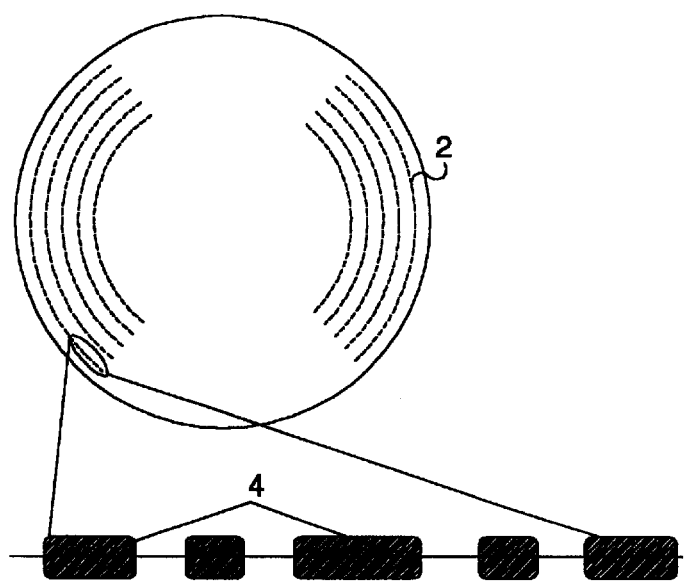
FIG. 1 is a schematic view showing the track structure of a conventional read-only type optical disc.

Also, the disc of FIG. 11 can be driven using the same disc driving apparatus as an optical disc shown in FIG. 1. In other words, the optical disc according to an embodiment of the present invention can be used interchangeably for the optical discs of FIG. 1 to FIG. 3.

However, the optical disc is preferred to be applied in a read-only type disc environment as shown in FIG. 1. But as mentioned before, the disc may be used in a rewritable environment as well. For example, if prepit trains on the header field are defined in a wobbled pit train shape as shown in FIG. 11 in the case of a disc of FIG. 3, then the tracking control according to the present invention is performed at the header field in the same manner as the recording field.

As described above, the tracking control method and apparatus according to the present invention compares amplitudes of wobbling signals preformatted in the land or groove tracks to generate a tracking error signal. Further, the tracking control method and apparatus according to the present invention can generate an integrated tracking error signal having positive and negative voltage levels depending upon whether a light beam off center toward the inner side or the outer side from the center lines of the land and groove tracks. Accordingly, the tracking control method and apparatus according to the present invention can perform a stable and accurate tracking control without the need for a land/groove track identification.

Moreover, in the optical recording medium according to the present invention, continuous or intermittent information pit trains make a wobbled signal track so that the tracking method according to the present invention is applicable to the recording medium. Further, the optical recording medium according to the present invention can be reproduced by means of the same disc driver as a rewritable optical disc such as the existing DVD-RAM and so on. In other words, the optical recording medium is interchangeable to a rewritable optical disc such as DVD-RAM and the like.

Although the present invention has been explained by the embodiments shown in the drawings described above, it should be understood to the ordinary skilled person in the art that the invention is not limited to the embodiments, but rather than that various changes or modifications thereof are possible without departing from the spirit of the invention. Accordingly, the scope of the invention shall be determined only by the appended claims and their equivalents.

What is claimed is:

1. A tracking control method wherein a light beam is traced along a center line of any one of land and groove tracks formed on a recording medium in a wobbled shape, said method comprising:

detecting a first and second wobbling signals corresponding to each side of the track irradiated with the light beam;

subtracting the second wobbling signal from the first wobbling signal to generate a difference signal;

adding the first and second wobbling signals to generate a sum signal;

mixing the difference signal with the sum signal to generate a mixed signal;

integrating the mixed signal to generate the tracking error signal; and performing a tracking control based on the tracking error signal.

2. The tracking control method as claimed in claim 1, wherein said land and groove tracks are formed in parallel from the inner circumference of the optical recording medium into the outer circumference thereof.

3. The tracking control method as claimed in claim 1, wherein said land and groove tracks are alternately arranged every once rotation to make a single spiral track.

4. The tracking control method as claimed in claim 1, wherein said optical recording medium has land and groove signal tracks wobbled continuously.

5. The tracking control method as claimed in claim 1, wherein said optical recording medium includes land and groove signal tracks wobbled intermittently, and prepit trains alternated with the land and groove signal tracks.

6. The tracking control method as claimed in claim 5, wherein said prepit trains are wobbled.

7. A tracking control apparatus wherein a light beam is traced along a center line of any one of land and groove tracks formed on a recording medium in a wobbled shape, said apparatus comprising:

a signal detector for detecting a first and second wobbling signals corresponding to each side of the track irradiated with the light beam;

a subtractor subtracting the second wobbling signal from the first wobbling signal to generate a difference signal;

an adder for adding the first and second wobbling signals to generate a sum signal;

a mixer for mixing the difference signal with the sum signal form the adder; and an integrator for integrating an output signal from the mixer to generate the tracking error signal;

a tracking controller for performing a tracking control based on the tracking error signal.

8. The tracking control apparatus as claimed in claim 7, wherein said signal detector comprises:

a photo detector for converting the light beam reflected by the track to an electrical signal to generate first and second light detection signals, the first and second light detection signals corresponding to each side of the track;

a first filter for filtering the first light detection signal to generate a first wobbling signal; and a second filter for filtering the second light detection signal to generate a second wobbling signal.

9. The tracking control apparatus as claimed in claim 7, wherein said land and groove tracks are formed in parallel from the inner circumference of the optical recording medium into the outer circumference thereof.

10. The tracking control method as claimed in claim 7, wherein said land and groove tracks are alternately arranged every once rotation to make a single spiral track.

11. The tracking control method as claimed in claim 7, wherein said optical recording medium has land and groove signal tracks wobbled continuously.

12. The tracking control method as claimed in claim 7, wherein said optical recording medium includes land and groove signal tracks wobbled intermittently, and prepit trains alternated with the land and groove signal tracks.

13. The tracking control method as claimed in claim 12, wherein said prepit trains are wobbled.

* * * * *